W. F. KENLY.
HOSE CLAMP.
APPLICATION FILED JAN. 16, 1915.
1,187,430.
Patented June 13, 1916.
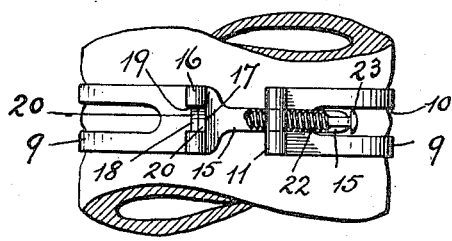
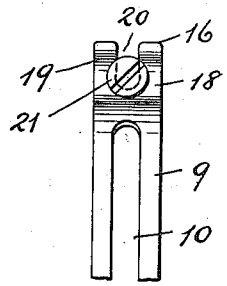
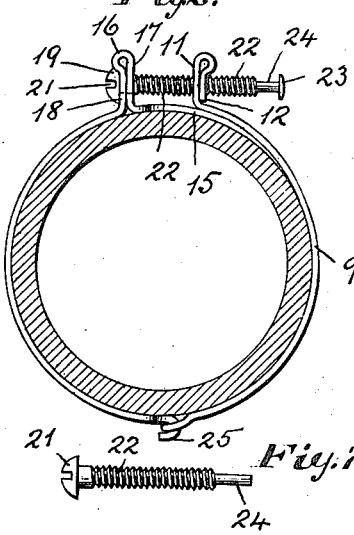
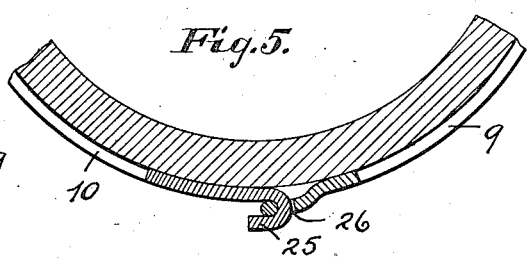
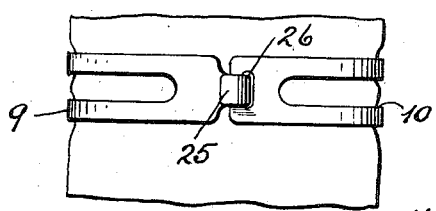
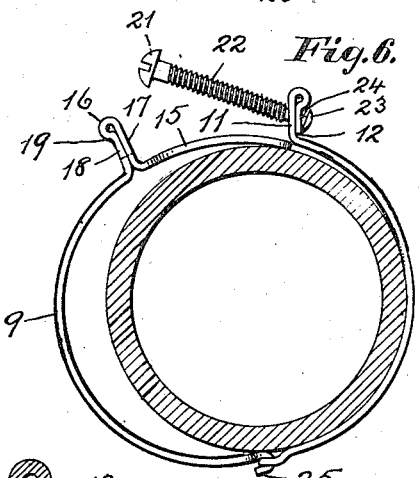
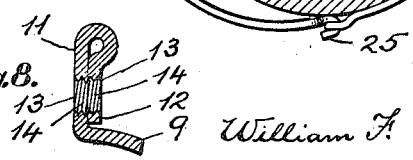
Witnesses
Porter H. Flautt
Bertha K. Walker
Inventor
William F. Kenly
By
Attorneys

UNITED STATES PATENT OFFICE.

WILMER F. KENLY, OF YORK, PENNSYLVANIA, ASSIGNOR OF ONE-HALF TO LEONARD C. GROVE, OF YORK, PENNSYLVANIA.

HOSE-CLAMP.

1,187,430.  Specification of Letters Patent.  Patented June 13, 1916.

Application filed January 16, 1915. Serial No. 2,547.

*To all whom it may concern:*

Be it known that I, WILMER F. KENLY, a citizen of the United States, residing at York, in the county of York and State of Pennsylvania, have invented certain new and useful Improvements in Hose-Clamps, of which the following is a specification.

This invention relates to improvements in hose clamps and has reference to a clamp that may be used to clamp the end of a piece of hose to a pipe or a nozzle, or to clamp the hose about any cylindrical object.

One object of the invention is to provide a flexible sheet-metal band with an improved construction for securing its two ends together when the band is around a piece of hose.

A further object is to provide an arrangement of securing means that may be operated to readily connect the ends of the clamp without the difficulties that arise where the fastening means is required to register with perforations in the clamp-ends.

With these, and other objects in view, the invention is illustrated in the accompanying drawing, in which,—

Figure 1, shows a piece of hose with the improved clamp around the same, and in which the bolt is shown broken. Fig. 2, shows a piece of hose in cross-section with the improved clamp around the same and secured in clamped position thereon. Fig. 3, illustrates the clamp on a piece of hose as viewed from the side where the two parts of the clamp are pivotally connected. Fig. 4, shows the upper portion of the clamp as viewed from one side. Fig. 5, illustrates on an enlarged scale a sectional detail through the pivotally-connected ends of the clamp. Fig. 6, shows the clamp surrounding a piece of hose in readiness to be lapped and clamped and illustrates the operation of attaching the clamp. Fig. 7, illustrates the threaded bolt used in making the connection between the two clamping ends of the clamp and prior to its attachment thereto, and before the formation of its rivet head. Fig. 8, shows an enlarged sectional detail through the clamp end to which the bolt is to be attached.

Referring to the drawing the numeral 9, designates the flexible sheet-metal clamp proper, which, for the purpose of reducing weight and for better clamping action about a hose, is provided with a circumferential slot 10. Near one end the metal of the clamp is turned laterally to form an outturned flange 11, and the extreme end 12, is turned back and laid close against the side of the said out-turned flange thus forming a double-thick wall. This out-turned flange 11, and the turned-back end 12, are both provided with perforations 13, that register, and the walls of said perforations are provided with screw-threads 14, as clearly shown in Fig. 8, of the drawings.

The opposite and coacting end of the clamp is provided with a central tongue 15, and at the root of said tongue said clamp portion is provided with a fold 16, that forms an outwardly-projecting stop-flange which comprises two walls 17 and 18, respectively. The wall 17, of this stop flange carries the aforesaid central tongue 15, and the latter projects forwardly from said wall so as to underlap the opposite clamp-end which carries the out-turned flange 11, and the back turned end 12, thus presenting said tongue-end 15 coincident with the circumferential slot 10 into which it will enter.

The fold 16, by which the two-wall stop-flange is formed overhangs at one side of wall 18, thereby producing a shoulder 19, at the outer end of the stop flange.

Both walls 17 and 18 of this stop-flange are provided with a central slot 20, as shown in Figs. 1 and 4 of the drawing, which slot opens through the fold 16, for a purpose presently to be described.

A bolt having a slotted head 21, at one end; a threaded body 22, intermediate its ends; a rivet head 23, at the other end and a reduced and circumferentially smooth shank 24, between the threaded body and rivet head, is also employed to effect a contraction of the clamp. This bolt is permanently attached to one end of the clamp in that the smooth shank 24, thereof passes freely through the threaded perforations 13, in the out-turned flange 11, and also freely through the turned-back end 12,—the rivet head 23, that is formed on the end of the bolt after it has been projected through said perforations, has position at the outer side of the turned-back end 12, serving to prevent withdrawal of the bolt. This manner of securing the bolt prevents it from detachment, and allows either its smooth shank 24, to be loose in the threaded perforation 13, or the end of the screw-threaded body 22, adjoining the said shank to be slightly engaged with said threaded perforation. When the screw is thus engaged the band-clamp 9, may be placed in position around a piece of hose and the two ends of said clamp pressed toward each other, whereupon the head 21, of the bolt will pass over the outer end 16, of the double-thick fold and the screw-body of the bolt will pass into the open slot 20. At the same time the tongue 15, on one end of the band-clamp 9, will slide under the opposite end of the band and said tongue will enter the circumferential slot 10.

The two ends of the clamp may be drawn toward each other by using a screw-driver on the slotted bolt-head 21. When the bolt seats in the slot 20, the head 21, will assume a position beneath the shoulder 19, formed by the overhanging folds 16, and by this means, when the bolt is screwed up said head will be held against accidental displacement.

In some instances, I prefer to make the clamp in two parts and effect a joinder of those parts in the manner of a hinge,—one form of such joint comprising a hook 25, on one part that may pass through a slot 26 in the other part. It is obvious the sheet-metal clamp 9, in one piece without a hinge-joint may be long enough to entirely encircle the hose.

By providing the tongue 15 that projects, in advance of the slotted stop flange and in circumferential alinement therewith, an advantage is gained in the clamping operation by reason of the fact that when said tongue underlaps the parts 11 and 12 its free end will have position in the circumferential slot 10, and thereby will guide the stop flange toward the parts 11 and 12, so as to keep the open-end slot 20, in the stop flange in alinement with the threaded perforations 13, and enable the bolt to close the clamp by a straight pull.

Having thus described my invention what I claim is,—

A sheet-metal hose clamp having in combination, a flexible band one end of which has an out-turned flange provided with a screw-threaded hole; a bolt having a screw-threaded body provided at one end with a slotted head and at the opposite end with a rivet head, the bolt adjoining said rivet head having a smooth shank smaller in diameter than said screw-threaded body—said bolt being movable in but not detachable from said screw-threaded hole; the other end of the flexible band having a double-thick fold turned outwardly said fold provided with a central open-end slot and one side of said fold being provided at its outer end with a lateral shoulder, whereby when the body of the bolt seats in the open-end slot the bolt-head will engage beneath said shoulder and be held against accidental displacement.

In testimony whereof I affix my signature in presence of two witnesses.

WILMER F. KENLY.

Witnesses:
 IRVIN F. GROVE,
 EDWARD C. BOECKEL.